INVENTORS
BRIAN WATSON POLLARD
BRIAN GUY WELBY

Cushman, Darby + Cushman
ATTORNEYS

Aug. 31, 1954 B. W. POLLARD ET AL 2,688,049

SIGNAL-RECEIVING APPARATUS

Filed Feb. 27, 1952 3 Sheets-Sheet 2

INVENTORS
BRIAN WATSON POLLARD
BRIAN GUY WELBY

Cushman, Darby & Cushman
ATTORNEYS

INVENTORS
BRIAN WATSON POLLARD
BRIAN GUY WELBY
Cushman, Darby & Cushman
ATTORNEYS Patented Aug. 31, 1954 2,688,049

UNITED STATES PATENT OFFICE 2,688,049

SIGNAL-RECEIVING APPARATUS

Brian Watson Pollard, Glossop, and Brian Guy Welby, Shale, England, assignors to Ferranti Limited, Hollinwood, England, a British company Application February 27, 1952, Serial No. 273,762

Claims priority, application Great Britain February 27, 1951

17 Claims. (Cl. 178—17)

This invention relates to a system or apparatus wherein the high-speed motion of a moving web, tape or ribbon, hereinafter referred to as a tape, is controlled by means of the position of a control recording, marking or the like on the tape with respect to a relatively fixed control position and has particular reference to apparatus for deriving electrical signals from intelligence represented by groups of perforations, markings or recordings—each of which groups will hereinafter be referred to as a character—recorded successively along the tape. Such markings may be transparent markings on an otherwise opaque tape; such recordings may be magnetic recordings in magnetic tape. Other forms of marking or recordings may however be used.

The invention has particular but by no means exclusive application to systems of the kind in which each character is a group of perforations and the "reading" of each character is effected at the "reader" position by passing a beam of light through the tape at each component perforation and causing each beam to activate photo-sensitive means individual to the position of that perforation in the group.

With such an arrangement it may be necessary to stop or at least to retard the tape at each character to allow that character to be read and then accelerate the tape to bring the next character to the reading position. The speed of reading is thus to a large extent determined by the speed with which the feed mechanism can feed the tape in this intermittent manner past the reading position without damaging the tape even after it has been passed a large number of times through the reader. In all known arrangements for reading perforated tape, as far as we are aware, the reader is controlled by the feed mechanism and in order to ensure that the operation of the reader is synchronized with the arrival of each character at the reading position a positive drive must be provided to feed the tape. In the case of a teleprinter such a drive is usually effected by means of a single sprocket which engages a row of drive perforations located in a central position along the tape. In practice with such an arrangement the drive is applied to the tape at any given moment by way of the leading edges of a few holes, with the result that unless the drive is slow the holes soon become torn.

A further difficulty that limits the speed to a low value is that of providing a feed mechanism that will efficiently supply the irregular drive referred to.

An object of the present invention is to provide an apparatus or system for the purpose stated, the speed of operation of which is considerably increased above that of known receivers without subjecting the tape to appreciable wear.

A further object of the invention is to provide apparatus for the purpose stated having an improved drive to the tape permitting smooth and rapid starting and stopping. It is preferred to use a non-positive drive to the tape, wherein inertia effects due to starting and stopping cannot result in damage to the tape or the reading apparatus, and wherein the inertia of the moving parts can be kept within the limits practicable for high-speed intermittent operation.

A further object of the invention is to provide an apparatus or system of the kind referred to wherein the reader is controlled exclusively by the action of a high-speed control device responsive to a control recording on the tape as contrasted with positive control by a positive drive to the tape.

A further object of the invention is to provide an apparatus or system of the kind referred to wherein the inertia effects of the drive are sufficiently small and of constant value at the operating speeds to allow compensation therefor by a device giving a determinable "lead" between the initiation of the tape arresting means and the commencement of reading.

A further object of the invention is to provide a system or apparatus of the kind referred to wherein the overall control both as regards tape motion and reading is exercised by a control recording on the tape and whose accuracy and efficiency of working is therefore independent of errors in the spacing of the recorded characters from each other and of slight creeping or slip of the tape during driving.

In accordance with the present invention a system of the kind referred to comprises a tape having control recordings associated with the recorded characters, means for feeding the tape past a reading position, signal reading apparatus at the reading position, a location device co-operating with the control recordings and control means actuated by the location device to retard or arrest the tape and initiate reading and to accelerate the tape after reading.

More specifically, in accordance with the present invention apparatus for deriving electrical signals from intelligence represented by characters (as hereinbefore defined) recorded successively along a tape comprises a frictional drive arrangement for feeding said tape past a reading position, reading apparatus located at said reading position for deriving said signals from said characters, associated with each of said characters on said tape a control recording, and control means adapted to be actuated by the registration of each of such control recordings with a location device sequentially to retard or arrest the feeding of said tape with the associated character located in said reading position, to cause or allow said reading apparatus to derive said signals from that character, and to accelerate the feeding of said tape after said signals have been derived.

The drive arrangement for the tape may include a first differential gear having an input shaft arranged to be rotated at a uniform speed and having first and second output shafts, means coupled to said first output shaft for nonpositive or frictional feeding of said tape, and first and second electrically actuated braking systems for retarding or arresting the rotation of said first output shaft and retarding or arresting the rotation of said second output shaft respectively under such control of said control means that said second braking system is applied to cause said tape to be fed past the reading position and said first braking system is applied to retard or arrest the feeding of said tape.

For the purpose of providing a two-speed drive, said second output shaft may be coupled to the first output shaft of a second differential gear the input shaft of which is adapted to be rotated at a uniform speed high compared with that of said first differential gear, there being provided a third electrically actuated braking system for retarding or arresting or retarding a second output shaft of said third differential gear under such control of said control means that only said third braking system is applied to cause said tape to be fed past the reading position at a high speed compared to the feeding speed due to said first differential gear.

For the purpose of providing forward and reverse drive, said first output shaft of said first differential gear may be coupled to the first output shaft of a reverse differential gear, there being provided a reverse electrically actuated braking system for retarding or arresting the rotation of the second output shaft of said reverse differential gear, whereby the application of said reverse braking system causes said tape to be fed in the reverse direction to which it is adapted to be fed by said first differential gear, or, in the case of a two-speed drive, by the combination of said first and said second differential gears, as the case may be.

The control recording may be a perforation through, or a transparent marking on, otherwise opaque tape, and the location device comprises preferably a photosensitive component arranged so that its degree of illumination is varied by the coming into registration of said control recording.

The control means for controlling the motion of the tape and the reader operation, may include a shaping stage for producing an output voltage of square waveform in such dependence on a control signal derived from said photosensitive component that the leading edge of each square wave is generated when said control signal has risen or fallen from a datum level, corresponding to said component not being in registration with a said control recording, to a first predetermined level and the ensuing trailing edge is generated when said control signal has fallen or risen, as the case may be, to a second predetermined level.

The above mentioned and other features of the invention and the attendant advantages thereof will be understood from the following more detailed description with reference to the accompanying schematic drawings of an example of a system according to the invention.

Figures 1, 2:
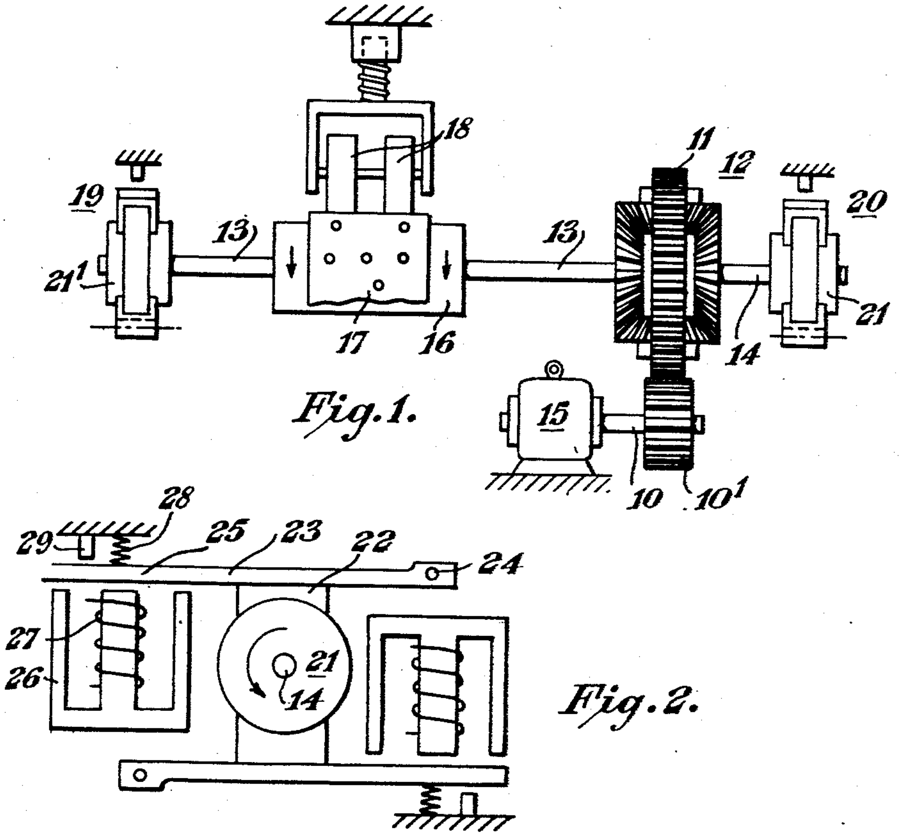
Fig. 1 shows in elevation apparatus forming a part of one embodiment of the invention.
Fig. 2 is a more detailed view of part of the apparatus shown in Fig. 1.

The embodiment here described is a system or apparatus for deriving signals from intelligence represented by characters formed as groups of, say, up to six perforations in a tape of opaque paper or like material. The preferred low inertia frictional drive arrangement is shown in a somewhat simplified form in Fig. 1. This consists of an input shaft 10, rotated at a constant speed by a motor 15, for driving through a pinion 10[1] the planet-carrying gear wheel 11 of a first differential gear 12 having first and second output shafts 13 and 14 respectively. Shaft 13 carries a driving drum 16. The tape 17 passes over this drum and is held against it by spring-mounted rollers 18, which with the drum 16 constitute a frictional drive for feeding the tape past a reading position, which position is described below with reference to Fig. 3.

Associated with the first output shaft 13 is a first electromagnetic braking system 19; and associated with the second output shaft 14 is a second braking system 20. These braking systems are alike. One of them, system 20, is shown more clearly in end elevation in Fig. 2. In engagement with a brake drum 21 secured to shaft 14 is a brake shoe 22 carried by a brake lever 23, one end of which is pivoted at 24 and the other end of which acts as the armature 25 of an electromagnet 26 arranged to be energised by a winding 27. On the opposite side of armature 25 is a light compression spring 28 which serves to maintain the brake shoe 22 in engagement with the drum and so prevent bounce when the brake is applied. On this side of the armature is also provided a stop pin 29 to restrict the movement of the brake lever in a direction away from the drum. Components 22 to 29 are duplicated but not referenced on the opposite side of the drum 21.

Figure 3:
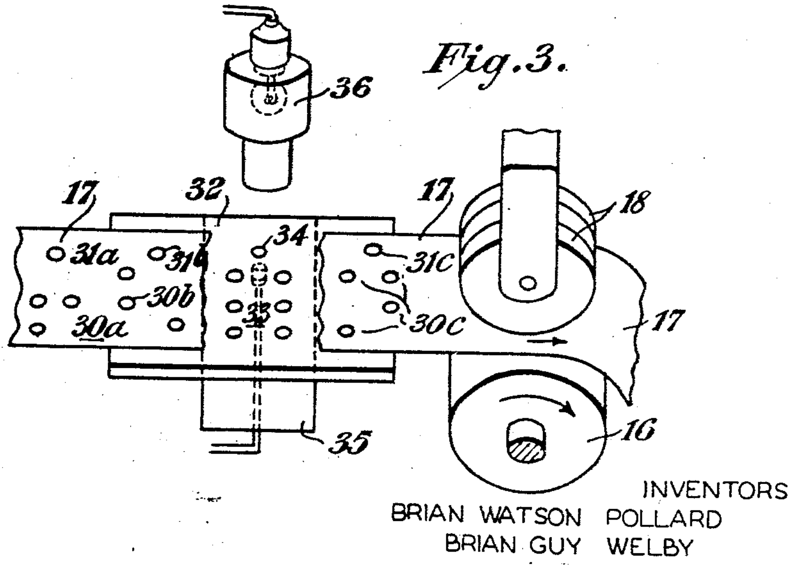
Fig. 3 is a view in perspective of apparatus at the reading position forming a further part of the embodiment illustrated in Fig. 1.

Part of the reading equipment provided at the reading position is shown in Fig. 3, in which those components that are depicted in Fig. 1 are given the same references. Associated with each character—i. e. with each group 30*a*, 30*b*, 30*c* etc. of up to six perforations—on the tape 17 is a control recording in the form of a perforation 31*a*, 31*b*, 31*c* etc. In the reading position there is formed in a reading plate 32 a group of six apertures 33 in the six possible code positions of the perforations of each character. Also formed in the reading plate is a seventh aperture 34, hereinafter referred to as the location or registration aperture, in a position corresponding to that of each control perforation 31 relative to the associated character. A portion of the tape has been shown broken away in Fig. 3 in order to reveal these apertures. In register with each of these seven apertures and mounted in a container 35 are seven photocells of the emissive type, one of which, i. e. that in register with the location aperture is shown at 41. Above the reading plate is mounted a light source 36 including an optical system (not shown) arranged to concentrate the light on that portion of the tape covering the seven apertures.

Figure 4:
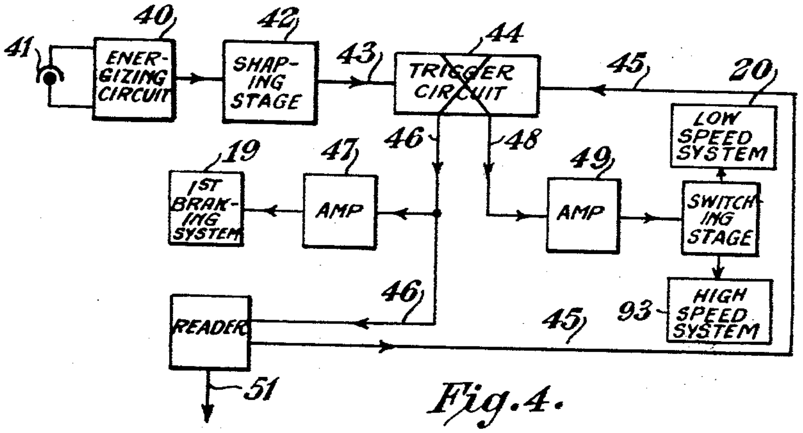
Fig. 4 is a block schematic diagram of connections for the embodiment illustrated in Figs. 1 to 3.

With this arrangement, when each character is in the reading position, the light from illuminant 36 passes to only those photocells that correspond to the perforations of that character; as each character has a control perforation 31*a*, 31*b*, 31*c* etc. the light will also pass to the photocell 41 in register with aperture 34. This photocell will subsequently be referred to as the location photocell. In synchronism with the arrival of each character at the reading position, the control perforation of that character comes into register with aperture 34. The location photocell 41 thus becomes illuminated. The resulting pulse from the photocell is used to control the brakes with the result that the tape feed is stopped with that character in the reading position. The manner in which the location photocell exercises this control on the tape feed will now be described with reference to Fig. 4.

The output of the location photocell 41 is fed to the amplifier energising circuit 40, from which an output connection is made to control means in the form of a shaping stage 42 that is designed to produce a negative-going step function output whenever the voltage—hereinafter referred to as the control signal—applied to it from the photocell circuit 40 reaches some predetermined value as the result of the illumination of the photocell by the illuminant 36. This output is applied over a lead 43 to a di-stable trigger circuit 44, which is designed to be triggered from a first stable state to a second stable state on receipt of a negative-going signal applied over lead 43 and to be triggered from this second state back to the first on receipt of a negative-going signal applied over a lead 45. The two outputs of the trigger circuit have alternately a zero and a negative potential. The output that is of negative polarity when the trigger circuit is in its first stable state is applied over output lead 46 to a power amplifier 47 the output of which is applied to energise the winding 27 of the first braking system 19. The output that is of zero potential when the circuit is in its first stable state is applied over output lead 48 to another power amplifier 49 the output of which is applied to energise the windings 27 of the second braking system 20. Output lead 46 is also connected to the reading apparatus 50, from which is derived, and applied over lead 45, the negative trigger pulse for restoring trigger circuit 44 to its first stable state.

In describing the operation of this equipment it will be assumed to begin with that an unperforated length of tape is being fed past the reading position. As the location photocell 41 is not illuminated, trigger circuit 44 is in its first stable state of operation. Accordingly the output voltage applied over lead 48 to amplifier 49 serving the second braking system is at zero level, with the result that this amplifier is conducting, the electromagnets of the braking system are energised and the brakes are applied to the brake drum of shaft 14 (see Fig. 1) to prevent its rotation. At the same time the voltage applied over lead 46 to the amplifier 47 serving the first braking system is of negative polarity, with the result that the brakes are not applied to the brake drum of shaft 13. The drive from motor 15 is thus applied only to shaft 13 and so the tape is being fed steadily past the reading position.

Assume now that a perforated section of the tape reaches the reading position. The feed is maintained until a control perforation 31*a*, 31*b* or 31*c* etc. (see Fig. 3) of the first character begins to come into registration with the aperture 34 of the location photocell, the illumination of which is thereby increased. When the resulting rise of current in the photocell circuit causes the voltage of the control signal to change from the datum value which it had when the location photocell was not illuminated to the said predetermined value, the step-function output is produced from shaping stage 42, thereby applying a trigger pulse to circuit 44. The latter thereupon changes over to its second stable state. The outputs of the trigger circuit change over also, that on lead 46 rising to earth potential and that on lead 48 falling to a negative potential. These latter changes cause the brakes of the first system to be applied and those of the second system to be released. The tape feed is thus arrested and the input drive to differential 12 (Fig. 1) smoothly transferred to shaft 14 without causing any interruption of the rotation of the planet carrier 11 or of the drive to it. If the control signal voltage is appropriately chosen with relation to the inertia of the system, the tape feed is arrested so quickly that by the time the tape has ceased to move, the character concerned is correctly placed in the reading position and the control perforation is fully in register with aperture 34 of the location photocell.

By means of a trigger pulse derived from output lead 46 as the potential on this lead rises to earth level, the reading apparatus 50 is set in operation and the character read by the six "reading" photocells and the system in use. At the end of this process the reading apparatus applies to the trigger circuit over input lead 45 a negative-going pulse that causes this circuit to revert to its first stable state. The brakes of braking system 19 are accordingly released from shaft 13, and those of braking system 20 are applied to shaft 14, so that the tape feed is restarted.

The reader 50 may be of any suitable known form which executes an operative cycle, during which the respective outputs from the six photoelectric cells located at the reading position are utilized to control the generation of output signals on lead 51—representative of the particular punch hole combination then being examined, in response to the "read" starting pulse signal delivered on lead 46, and which also provides a check signal on lead 45 when the reading operation has been completed. In order to take full advantage of the increased speeds of tape movement obtainable with the system according to the invention, such reader may be of wholly electronic character and may comprise, for instance a series of seven monostable electronic trigger circuits connected in cascade so as to be triggered in turn by the resetting of the immediately preceding trigger circuit. The first trigger circuit is arranged to be triggered into its unstable condition by the starting pulse supplied on lead 46 and while in such triggered condition it supplies a stimulating potential for releasing an otherwise normally blocked amplifier whose input is derived from the first of the reading photocells. This amplifier output is connected to the output lead 51. Upon reversion of the first trigger circuit to its normal stable condition at the end of the predetermined period time, the second trigger circuit is similarly triggered to its unstable condition and thereby causes the release of another normally blocked amplifier whose input is derived from the second of the photocells and whose output is also connected to the output lead 51. The third, fourth, fifth and sixth trigger circuits are arranged similarly to control the sequential supply of signals indicative of the illuminated or non-illuminated state of the related photocells to the output lead 51. The seventh trigger circuit provides the output pulse on lead 45 marking the completion of the reading operation.

As soon as the feed has been resumed the control perforation passes out of registration with aperture 34 and accordingly the value of the control signal reverts to its datum level.

The feed continues until the next character nears the reader, when the corresponding control perforation begins to come into registration with the location photocell 41 and the operations above described are repeated.

If it is required to omit any character it is only necessary to cover up the corresponding control perforation. Alternatively, this perforation may be elongated to connect up with the control perforation of the preceding character; this method relies on the fact that a positive change of illumination is required to stop the tape.

Shaping stage 42 for producing the negative-going step-function output to actuate trigger circuit 44 whenever the value of the control signal reaches a predetermined level from its datum level may be designed to generate a negative-going square wave; the leading edge of this, i. e., the step-function output above referred to, is generated as soon as the control signal passes in one direction through a first predetermined voltage level and the trailing edge is generated when the control signal passes in the reverse direction through a second predetermined level during its return to the datum level. Various known kinds of shaping circuit of this sort are available.

Figure 5:
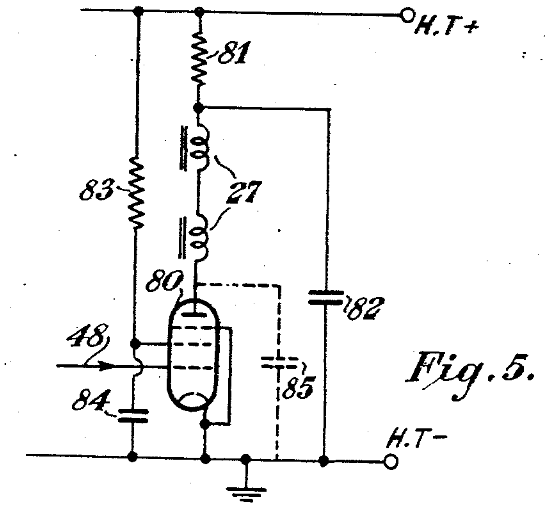
Fig. 5 is a schematic circuit diagram showing details of one apparatus shown generally in Fig. 4.

Each of the power amplifiers 47 or 49 may be arranged as follows, referring to Fig. 5 which shows specifically amplifier 49.

A pentode valve 80 has its anode connected by way of windings 27 of the second braking system and a load resistor 81 of about 2,500 ohms to the positive pole of a source of supply, the negative pole of which is earthed. The common point of resistor 81 and the windings is earthed by way of a capacitor 82 of large capacitance—say 2 microfarads. The suppressor grid is connected direct to the cathode, which is earthed. The screen grid is connected by way of a resistor 83 of about 10,000 ohms to the positive pole of the supply and is decoupled to earth by a capacitor 84 of about 0.1 microfarad. Lead 48 from the trigger circuit is connected to the control grid.

In operation, when the brakes are not required to be applied, the output from trigger circuit 44 over lead 48 is at a negative potential. Pentode 80 is accordingly cut off, the windings 27 are unenergized, and capacitor 82 charged to the voltage of the source. As soon as the trigger circuit has been changed over the voltage applied by it to this amplifier rises to earth level, and the valve takes current. Practically the full voltage of capacitor 82 thus becomes applied to the brake windings. The voltage across the windings decays with time until an equilibrium condition is reached when the potential on the anode has fallen to the value appropriate to the current then flowing through the valve.

If it is found that the brakes are released so suddenly as to cause bounce or chatter the anode of pentode 80 may be earthed by way of another capacitor 85 of about 0.05 microfarad. This has the effect of slowing down the initial rate of change of current in the windings 27 when its valve is cut off and prevents the generation of high surge voltage that would tend to break down the insulation of the windings.

It will be appreciated that with a differential gear of the kind described, having equal gear wheels on the output shafts, the braking to a standstill of either output shaft causes the other output shaft to rotate at twice the speed it would rotate at if both shafts were allowed to rotate freely.

With such an arrangement, not only does the frictional drive impose no appreciable wear on the tape even after it has been passed through the reader several thousand times at a reading speed of the order of 200 characters per second or more, but the fact that the triggering of the reader is controlled entirely by the registration of the control perforations with the location photocell—and so is actuated only when each character is in the reading position—means that any slip between the tape and the drive is of minor importance. Furthermore, the distances between successive characters may be irregular, which is not possible when the reader is controlled by a positive drive to the tape.

To allow a sufficiently abrupt acceleration and retardation of the output shafts and drums these components are constructed so as to have a very low inertia; so also are the gear wheels that are secured to these shafts and that transmit the differential drive to them. As however the carrier, and any gear wheels between the carrier and the motor are rotated at a uniform speed the inertia of these components need not be restricted. The motion of the planet wheels is also constant insofar as their rotation round carrier 11 is concerned.

Figure 6:
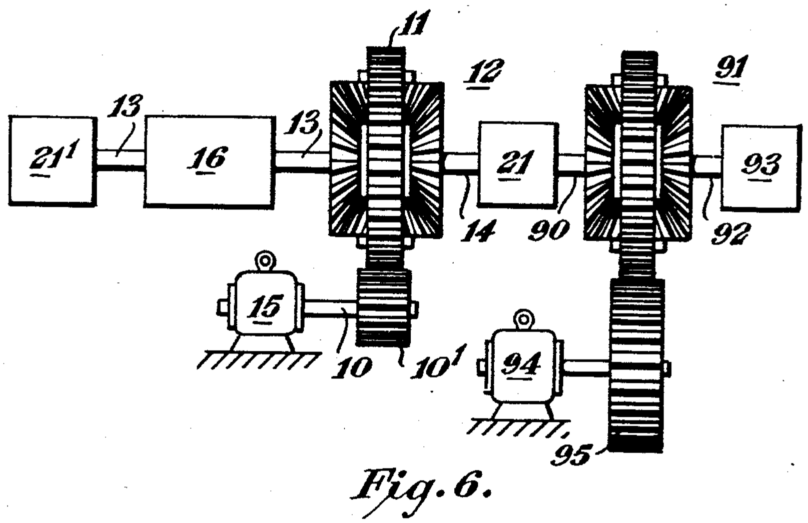
Figs. 6 and 7 are elevations of apparatus forming parts of further embodiments of the invention.

The use of the springs 28 that hold the brake shoes 22 lightly against their drums when not being applied has the further advantage of reducing the movement necessary to bring the shoes into braking action and hence of improving the retardation.

Where it is desired to employ a two-speed feed the apparatus of Fig. 1 may be modified as shown schematically in Fig. 6, in which the components that are also shown in Fig. 1 are given the same references. The details of the braking systems and the frictional drive to the tape shown in Figs. 1 and 2 are omitted from Fig. 6 to simplify the drawing, the braking systems 19 and 20 being represented by their brake drums 21[1] and 21 respectively. Output shaft 14 of the differential gear 12 is coupled as before to the brake drum 21, but the latter is coupled to the first output shaft 90 of a second differential gear 91, the second output shaft 92 of which is controlled by a third braking system represented by the brake drum 93. Differential gear 12 is arranged to be driven uniformly by motor 15 at a comparatively slow speed—corresponding to say 200 characters per second if shaft 14 is braked—whereas differential gear 91 is driven uniformly in the opposite direction by another motor 94 and pinion 95 (or alternatively by motor 15 through a suitable gear train) at a comparatively high speed—shaft 90 revolving at a speed corresponding to say 2000 characters per second if shaft 92 is braked.

With this arrangement, by applying only brake drum 93 of the third braking system (which may be of the same kind as the first or second system) the differential drives are additive, with the result that the tape is fed at a speed of 2200 characters per second. If only the second braking system is applied the drive of differential 91 is diverted to idle output shaft 92 and only the drive of differential 12 is applied to the feed, which accordingly takes place at the reduced speed of 200 characters per second. In either case, the tape is stopped by applying only the first braking system, as before.

Figure 7:
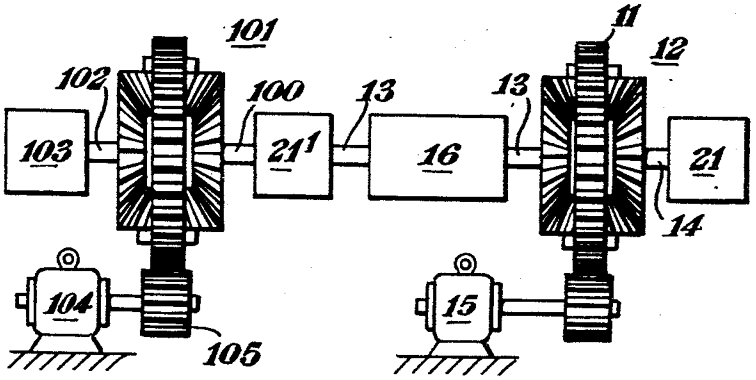

The retardation from the faster speed may be improved by applying, for a brief interval, the first braking system as well as the second. The effect of this is that the first braking system is tending to retard shaft 13 and the driving drum 16 from full speed down to rest whilst the second braking system is tending to retard shaft 14 from full speed to that corresponding to 200 characters per second. It is of course not necessary to arrest the second or third shaft to a standstill when causing the tape to be fed, though the maximum feeding speed is not attained unless the shaft concerned is so arrested.

Where it is desired to supply a reversible feed, shaft 13 of differential gear 12 may be coupled through the brake drum 21[1] of the first braking system (as shown in Fig. 7) to the first output shaft 100 of a similar reverse differential gear 101 the second output shaft 102 of which is controlled by a reverse braking system, represented only by the brake drum 103. This reverse differential 101 is driven at a uniform speed by a motor 104 and pinion 105 (or alternatively by motor 15 through a suitable gear train) in such a direction that when brought into use by applying only the reverse braking system (to bring shaft 102 to a standstill) the tape is fed in the opposite direction to that in which it is fed by differential 12. This reversing system is shown in Fig. 7 as applied to the driving arrangement of Fig. 1; it may however also be applied to the two-speed arrangement of Fig. 6.

The above descriptions are for illustrative purposes only and the various components of the drive and control means may be widely modified within the scope of the invention. For example, the tape may be Celluloid or the like with the characters formed as transparent markings in an otherwise opaque surface. The control recording may in this case be another transparent marking, allowing the light to reach the location device when coming into registration therewith as in the first-described embodiment. It is a particular advantage of the invention when applied to standard teleprinter tape that the holes provided in it for engagement with the driving of the teleprinter sprocket may be made to act as the control recording, there being one such hole for each character.

For convenience of description, it has been assumed that the tape is brought to rest for reading. It will be understood, however, that this is not absolutely necessary or desirable since the rapid response of known reading systems will allow reading to take place with the tape moving, although considerably retarded as compared with its maximum speed.

The invention may also be applied, with suitable modifications, where the characters are recorded magnetically along magnetic tape.

It may be found advantageous to elongate the aperture 34 (Fig. 3) of the location photocell in the direction contrary to that of the feed in order to give the drive apparatus time to stop the feed with the association character exactly in the feed position. This is particularly the case where there is a small but nevertheless appreciable interval during which the value of the control signal falls from the datum to the first level. Alternatively where a single speed is used each control recording (location holes 31a, 31b, 31c etc.) may be given a slight lead over the corresponding character group 30a, 30b, 30c, etc., so that a registration of such control recording with the location hole 34, sufficient to generate the control signal, occurs slightly before full registration of the character group with the location group 33 in the plate 32, the inertia of the system then bringing the character group into full register by the time the tape is arrested.

As each square wave generated by shaping stage 42 is negative only during the period when the location photocell is illuminated and consequently only when the tape is in the reading position, this waveform may be used as a gate waveform to check that the tape has stopped accurately in the reading position and that the perforations of the character concerned have not overshot the apertures in the reading plate.

We claim:

1. A system for translating intelligence stored in the form of characters in a tape into electric signals comprising a tape having a control recording associated with each recorded character, frictional feeding means for feeding the tape past a reading position, a reader for reading said characters, a location device traversed by said control recording during the feeding of the tape, a differential gear having an input shaft and a plurality of output shafts one of which latter is coupled to said frictional feeding means, electrically operated braking means for said output shafts, and electrical control means responsive to the degrees of registration of the control recording with said location device to cause selective operation of said brakes to retard the tape and initiate the reading operation and to accelerate the tape after completion of reading.

2. A system according to claim 1 including first and second high-speed magnetic braking means for two opposite output shafts of the said differential gear, the said electrical control means having only two opposite conditions corresponding in the one case to application of said first braking means and removal of said second braking means and in the other case mutual reversal of said braking including means, and means for obtaining a sufficient degree of registration of said control recording with the location device to actuate said control means at a time slightly before the character is in reading position corresponding to the time allowed by the inertia of the driving system to bring the character fully into the reading position.

3. A system according to claim 1 including electromagnetic braking means controlling the stop and start operation of the tape and wherein the said electrical control means includes electronic amplifiers for energizing the windings of said braking means, said amplifier circuits including means for augmenting the initial current through said windings by a condenser discharge occurring upon receipt by said amplifiers of a signal generated by said control means upon registration of said control recording.

4. A system according to claim 3, including capacitive means in said amplifier circuits for preventing excess shock in release of said braking means.

5. Apparatus for deriving electrical signals from intelligence in the form of characters recorded on a tape comprising a control recording associated with each character in the tape, means for feeding the tape past a reading position comprising a differential gear having an input shaft and first and second output shafts, frictional tape feeding means coupled to the first output shaft and first and second electrically controlled braking means for said first and second output shafts, reading apparatus for reading said characters, a location device in the path of said control recording, and electrical control means responsive to registration of the control recording with the location device to control both of said braking means and the reading apparatus, said control means having a "read" and a "non-read" condition and said first braking means being in the "on" condition and the second braking means being in the "off" condition or vice versa according to the "read" or "non-read" condition of the control means.

6. Apparatus for deriving signals from intelligence represented by characters recorded successively along a tape comprising reading apparatus located at a reading position, a control recording associated with each character in the tape, a location device in the path of said control recording, means for feeding the tape past the reading position comprising differential gearing having a plurality of output shafts, frictional feeding means for the tape coupled to one of said output shafts, electrically operated braking means for said other shafts, and electrical control means controlling the operation of the braking means and reading means and actuated in response to registration of each control recording with the location device sequentially to retard said tape, to cause the reading apparatus to derive signals from the respective character, and to cause the tape to be accelerated after the signals have been derived.

7. Apparatus as claimed in claim 6 wherein said feeding means includes a first differential gear having an input shaft arranged to be rotated at a uniform speed and having first and second output shafts, a frictional drive coupled to said first output shaft for feeding said tape, and first and second electrically actuated braking systems for arresting or retarding the rotation of said first output shaft and arresting or retarding the rotation of said second output shaft respectively under such control of said control means that said second braking system is applied to cause said tape to be fed past the reading position and said first braking system is applied to arrest the feeding of said tape.

8. Apparatus as claimed in claim 7 wherein said second output shaft is coupled to the first output shaft of a second differential gear the input shaft of which is adapted to be rotated at a uniform speed high compared with that of said first differential gear, there being provided a third electrically actuated braking system for arresting or retarding a second output shaft of said second differential gear under such control of said control means that when only said third braking system is applied said tape is fed past the reading position at a higher speed compared to the feeding speed due to said first differential gear.

9. Apparatus as claimed in claim 7 wherein said first output shaft of said first differential gear is coupled to the first output shaft of a reverse differential gear, there being provided a reverse electrically actuated braking system for arresting the rotation of the second output shaft of said reverse differential gear, whereby the application of only said reverse braking system causes said tape to be fed in the reverse direction to which it is adapted to be fed by said first differential gear.

10. Apparatus as claimed in claim 8, wherein said first output shaft of said first differential gear is coupled to the first output shaft of a reverse differential gear, and wherein is provided a reverse electrically actuated braking system for arresting the second output shaft of the reverse differential gear, whereby the aplication of said reverse braking system causes the tape to be fed in the reverse direction to the feed derived from the combination of said first and second differential gears.

11. Apparatus as claimed in claim 6 wherein said control recording is a perforation through, or a transparent marking on, otherwise opaque tape, and said location device includes a photosensitive component arranged so that its extent of illumination is changed by the coming into registration with said component of said control recording.

12. Apparatus as claimed in claim 11 wherein said control means includes a shaping stage for producing an output voltage of square waveform in such dependence on a control signal derived from said photosensitive component that the leading edge of each square wave is generated when said control signal has risen or fallen from a datum level corresponding to said component not being in registration with a said control recording to a first predetermined level and the ensuing trailing edge is generated when said signal has fallen or risen, as the case may be, to a second predetermined level.

13. Apparatus as claimed in claim 12 wherein said output voltage of square waveform is applied to a trigger circuit having two stable conditions of operation and two outputs in antiphase there being provided amplifying means for applying said outputs to control said respective braking means.

14. Apparatus as claimed in claim 13 wherein said amplifying means in respect of either of said braking systems includes an amplifier the output of which is connected to a source of high tension by way of the actuating circuit of that braking system and a resistor, wherein the common point of said resistor and said actuating circuit is connected to the cathode or base electrode of said amplifier by a capacitor of large capacitance.

15. Apparatus for deriving electrical signals from intelligence in the form of characters recorded on a tape comprising a control recording associated with each character in the tape, means for feeding the tape past a reading position comprising a differential gear having an input shaft and first and second output shafts, frictional tape feeding means coupled to the first output shaft and first and second electrically controlled braking means for said first and second output shafts, reading apparatus for reading said characters, a location device in the path of said control recording, and electrical control means actuated in response to registration of the control recording with the location device to control both the said braking means and the reading apparatus so that the tape is retarded before the reading apparatus is allowed to derive signals from said characters and that the tape is accelerated again after reading has been completed.

16. Apparatus according to claim 15, wherein the control means includes a photosensitive device responsive to registration or non-registration of the control recording with the location device to initiate control signals, a trigger circuit having two stable conditions corresponding to the receipt of "stop" or "start" signals and two outputs in antiphase, and means for amplifying said outputs and applying them to control said first and second braking means.

17. Apparatus according to claim 16, wherein the reading apparatus includes means for receiving a "stop" pulse generated by the control means when the control recording attains registration to initiate the reading operation, and means for generating upon completion of reading a "start" pulse to be applied to said trigger circuit to reverse the condition thereof.

References Cited in the file of this patent

UNITED STATES PATENTS

| Number | Name | Date |
|---|---|---|
| 2,397,202 | Potts | Mar. 26, 1946 |
| 2,464,601 | Nicholas | Mar. 15, 1949 |